Patented Dec. 19, 1933

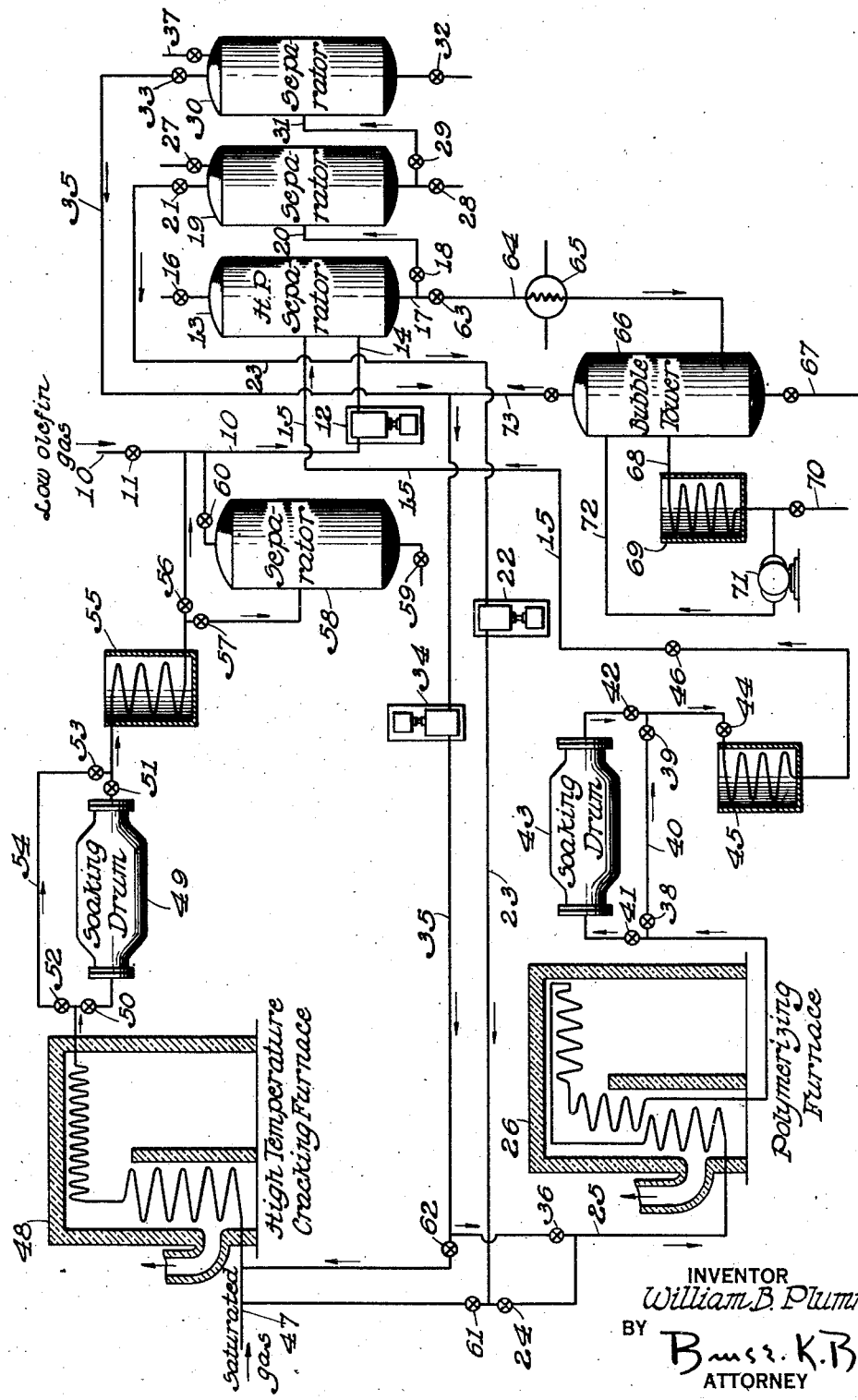

1,940,227

UNITED STATES PATENT OFFICE 1,940,227

POLYMERIZATION

William B. Plummer, Chicago, Ill., assignor to Standard Oil Company, Chicago, Ill., a corporation of Indiana Application August 24, 1932. Serial No. 630,284

7 Claims. (Cl. 196—10)

My invention relates to a process for the production of low boiling liquid hydrocarbons from normally gaseous hydrocarbon materials.

It is well known that low boiling hydrocarbons can be obtained from the gases having a high content of gaseous olefins (i. e. 60% or more) by subjecting such gases to polymerization at temperatures of 750° to 1000° F. and under pressures of 500 to 3000 lbs. per square inch. It is, however, difficult to prepare gases having such high olefin contents commercially without the use of expensive equipment and without high operating costs. Gases containing 25% to 50% of gaseous olefins are, however, often available or can readily be prepared by cracking of gaseous or liquid hydrocarbons. My invention makes such gases available as raw materials for a polymerization process of the above described type without the use of expensive and complicated concentration procedures.

Briefly described, the operation of my process is as follows: Starting with a gas containing 25% to 50% olefins I inject this gas into the high pressure product separator of my polymerization system, operating at essentially room temperature. By this means the olefinic hydrocarbons, and to a greater or less extent the paraffinic hydrocarbons of like molecular weight, are dissolved in the liquid products, but the methane, hydrogen and non-hydrocarbon gases present in the original gas and in the gases from the polymerization system, remain undissolved and are eliminated from the system. The pressure on the liquid products and gases dissolved therein is then reduced in one or more secondary stages, or the mixture may be reheated in one or more stages. The gases released from the secondary separators contain all of the olefins present in my original gas, as well as any unreacted olefins present in the gases from the polymerization system. These mixed released gases may contain from 60% to 85% olefins and may be injected directly into the heating and polymerization system which is of essentially conventional character.

I may also operate a high temperature gas cracking system in conjunction with my high pressure polymerizing system, in which case my initial raw material may be saturated paraffinic gases, such as ethane, propane or butane, or gases containing them. In this case I may recycle a certain proportion of the released gases from my secondary separators to the high temperature gas cracking step,—thus preventing the gradual building up of relatively inert saturated hydrocarbon fractions in cycle gas to the polymerization step.

My invention will be more clearly understood by reference to the accompanying drawing which forms a part of the specification and which diagrammatically represents an elevational plan of my improved system.

The operation of my process may be described in detail as follows: Referring to the drawing, I will first consider the simpler modification which is operated without the use of a high temperature gas cracking step as a preliminary or accessory thereto. Olefin gases containing 50% or less of olefins enter through line 10 and valve 11, and are compressed by pump 12. The compressed gases then enter high pressure product separator 13 at a low point 14, and products and gases from the polymerization system enter said separator at an intermediate point 15. Methane, hydrogen and other undissolved gases are removed through valve 16 and are eliminated from the system. Liquid polymerization products containing dissolved gases from the polymerization system and also dissolved components from the original low olefin content gas are removed through offtake 17, and the pressure thereon is reduced at valve 18. These products and gases then pass into separator 19 at an intermediate point 20. Released gases are drawn off through valve 21 and are pumped by pump 22 through line 23 and valve 24 to the inlet 25 of the polymerization heater 26. All of the gases may be so recycled or intermittently a part thereof may be bled off from the system through vent 27 on separator 19. Liquid products may be removed from separator 19 through valved offtake 28.

On the other hand, two or more intermediate or reduced pressure separators may be employed. In this case, separator 19 is operated at an intermediate pressure, liquid products and gases still remaining dissolved therein are withdrawn and further expanded through valve 29 entering separator 30 at an intermediate point 31. Liquid products are removed from separator 30 through valved offtake 32, and released gases are withdrawn through offtake 33 and delivered by pump 34 through line 35 and valve 36 to the inlet 25 of the polymerization heater 26. Separator 30 is also provided with a vent 37 and gases may be continuously or intermittently vented from either of separators 19 or 30 through vents 27 or 37, or from both thereof in different proportion to the total gas released therein, in such fashion as to maintain the olefin concentration entering heater 26 at an optimum. I may also operate secondary separators 19, 30, etc., at full pressure existing in fixed gas separator 13, but with use of reheating means prior to or contained in 19 and 30 (said means not being shown).

The balance of the polymerization system is essentially conventional. The olefinic gases, under pressures of 500 to 3,000 lbs. per square inch are heated in heater 26 at temperatures of 750° to 1,000° F. They may be maintained in suitable soaking coils in heater 26 for a sufficient time to insure complete reaction, or an unheated soaking drum following the heater may be used. The gases and vapors leaving the heater 26 pass through valves 38 and 39 in bypass 40, if no soaking chamber is to be used, or valves 38 and 39 may be closed and valves 41 and 42 opened, in which case the gases are subjected to additional soaking in drum 43 which may be horizontal or vertical, and may be provided with suitable means and offtakes for the removal of coke, heavy condensed products, etc. In either case the final gases pass through valve 44 and are essentially completely cooled in cooler 45 prior to passing through valve 46 and into the inlet 15 of high pressure separator 13. As previously stated, high pressure separator 13 will ordinarily operate at the full pressure prevailing at the outlet of the heater 26 or of the soaking drum 43. I may, however, reduce this pressure slightly at valves 44 and/or 46.

As previously stated, I may operate a high temperature gas cracking system as a preliminary or as an adjunct to my polymerization system. This is also illustrated in the drawing. In this modification I may use completely saturated gases as the raw material of my whole process. In this case these said gases enter the system through line 47 and pass through the coils of heater 48, wherein they are raised to temperatures above 1300° F. while under pressures of 0–100 lbs. per square inch above atmospheric. This heater may be followed by soaking chamber 49 or the soaking chamber 49 may be blanked off by valves 50 and 51, while the hot cracked gases pass through valves 52 and 53 in bypass 54. In either case the cracked gases are cooled in cooler 55. They may then pass directly through valve 56 into line 10, or valve 56 may be closed, in which case the gases pass through valve 57 into separator 58 wherein any small amounts of liquids or tarry material that may have been formed collect and are withdrawn through offtake 59 while the gases pass through valve 60 to line 10.

These gases will contain from 25% to 50% olefins by volume, depending on the starting material and on the conditions of the heating and cracking step, and their subsequent treatment is identical with that previously described.

If my polymerization system is operated in conjunction with a gas cracking system, as described in the previous modification, then under no circumstances in ordinary operations will there be any occasion for venting gases from separators 19 and 30 through vents 27 and 37, as previously described in order to prevent the building up of inert, paraffinic materials in the system. Instead of this, if such inerts tend to build up, I may continuously or intermittently recycle a part of the released gas from separator 19 or separator 30 to the gas cracking system through valve 61 or valve 62 respectively.

It will be understood that separators 19 and/or 30 may be replaced or substituted by separating and fractionating means of other types. For example, the liquids and dissolved products from separator 13 may be removed through valve 63 in line 64 with partial or complete reduction in pressure at valve 63, it may be heated by heater or interchanger 65 and injected into bubble tower 66 so arranged that heavy liquid products are removed at the bottom through line 67, light liquid products being removed from an intermediate point 68, cooled in cooler 69 and withdrawn from the system through 70, or a part thereof returned to the tower by pump 71 to an elevated point 72 therein in order more completely to strip the gases which leave the tower through line 73 at the top and which thereafter are subjected to the same operations previously described.

Wherever the term "without substantial reduction in pressure" (i. e., from that of the reaction) is used herein or in the claims hereof with respect to the operating conditions of high-pressure separator 13 this is to be understood as being subject to the qualification that frequently it is preferable not to operate the said separator at pressures above 2,000 lbs. per square inch, since at the temperatures attainable with ordinary cooling water the separation of phases is frequently not satisfactory at higher pressures. In case, therefore, that I make use of reaction pressures of above 2,000 lbs. I may reduce pressure to at least that point by valve 46 prior to high-pressure separator 13.

It is further understood that separators 13, 19 and 30 may be provided internally with bubble or baffle plates, heating or cooling coils, and/or other conventional means for improving separation therein.

The foregoing is a full and complete description of my invention.

I claim:

1. In a process for producing low boiling liquid hydrocarbons from low olefin content gases by concentration of their olefin content followed by polymerization at temperatures of 750° to 1000° F. while under pressures of 500 to 3000 lbs. per square inch above atmospheric, the steps of cooling gases and products from the polymerization step without substantial reduction in pressure, introducing said gases and condensed liquid products into a separator under said pressure, introducing aforesaid low olefin content gases into said separator at a low point therein, removing undissolved fixed gases from an elevated point therein and eliminating said fixed gases from the system, withdrawing liquid products and dissolved gases therefrom, reducing the pressure on said liquid products and dissolved gases, separating liquid products substantially free from dissolved gases, and passing released gases to the heating and polymerization step.

2. In a process for producing low boiling liquid hydrocarbons from low olefin content gases by concentration of their olefin content followed by polymerization at temperatures of 750° to 1000° F. while under pressures of 500 to 3000 lbs. per square inch above atmospheric, the steps of cooling gases and products from the polymerization step without substantial reduction in pressure, introducing said gases and condensed liquid products into a separator under said pressure, introducing aforesaid low olefin content gases into said separator at a low point therein, removing undissolved fixed gases from an elevated point therein and eliminating said fixed gases from the system, withdrawing liquid products and dissolved gases therefrom, reheating said liquid products and dissolved gases, separating liquid products substantially free from dissolved gases, and passing released gases to the heating and polymerization step.

3. In a process for producing low boiling liquid hydrocarbons from low olefin content gases by concentration of their olefin content followed by polymerization at temperatures of 750° to 1000° F. while under pressures of 500 to 3000 lbs. per square inch above atmospheric, the steps of cooling gases and products from the polymerization step without substantial reduction in pressure, introducing said gases and condensed liquid products into a separator under said pressure, introducing aforesaid low olefin content gases into said separator at a low point therein, removing undissolved fixed gases from an elevated point therein and eliminating said fixed gases from the system, withdrawing liquid products and dissolved gases therefrom, separating said liquid products and dissolved gases, passing a part of the released gases to the heating and polymerization step, passing a part of the released gases through a high temperature gas cracking step whereby additional olefins are formed, cooling the gases from the gas cracking step, and admixing cooled cracked gas from this step with aforesaid low olefin content gas prior to injection thereof into aforesaid high pressure separator.

4. In a process for producing low boiling liquid hydrocarbons from low olefin content gases by concentration of their olefin content followed by polymerization at temperatures of 750° to 1000° F. while under pressures of 500 to 3000 lbs. per square inch above atmospheric, the steps of cooling gases and products from the polymerization step without substantial reduction in pressure, introducing said gases and condensed liquid products into a separator under said pressure, introducing aforesaid low olefin content gases into said separator at a low point therein, removing undissolved fixed gases from an elevated point therein and eliminating said fixed gases from the system, withdrawing liquid products and dissolved gases therefrom, separating said liquid products and dissolved gases in a plurality of stages, separating released gases from each stage, passing released gases from one or more stages to the heating and polymerization step, passing released gases from other stages through a high temperature gas cracking step whereby additional olefins are formed, cooling the gases from the gas cracking step, and admixing cooled cracked gas from this step with aforesaid low olefin content gas prior to injection thereof into aforesaid high pressure separator.

5. In a process for producing low boiling hydrocarbon liquids from hydrocarbon gases predominately of the methane series, the steps of cracking said gases at high temperature and relatively low pressure to form a low olefin content gas, concentrating said olefins as later described and polymerizing said concentrated olefins at temperatures of 750° to 1000° F., while under pressure of 500 to 3000 lbs. per square inch above atmospheric, cooling gases and products from the polymerization step without substantial reduction in pressure, introducing said gases and condensed liquid products into a separator under said pressure, introducing aforesaid low olefin content gas into said separator at a low point therein, removing undissolved fixed gases from an elevated point therein and eliminating said fixed gases from the system, withdrawing liquid products and dissolved gases therefrom, reducing the pressure on said liquid products and dissolved gases, separating liquid products substantially free from dissolved gases, and passing released gases to the polymerization step.

6. In a process for producing low boiling hydrocarbon liquids from hydrocarbon gases predominately of the methane series, the steps of cracking said gases at high temperature and relatively low pressure to form a low olefin content gas, concentrating said olefins as later described and polymerizing said concentrated olefins at temperatures of 750° to 1000° F., while under pressure of 500 to 3000 lbs. per square inch above atmospheric, cooling gases and products from the polymerization step without substantial reduction in pressure, introducing said gases and condensed liquid products into a separator under said pressure, introducing aforesaid low olefin content gas into said separator at a low point therein, removing undissolved fixed gases from an elevated point therein and eliminating said fixed gases from the system, withdrawing liquid products and dissolved gases therefrom, separating said liquid products and dissolved gases, passing a part of the released gases to the polymerization step, passing a part of said released gases to the aforesaid high temperature gas cracking step whereby additional low olefin content gas is formed.

7. In a process for producing low boiling hydrocarbon liquids from hydrocarbon gases predominately of the methane series, the steps of cracking said gases at high temperature and relatively low pressure to form a low olefin content gas, concentrating said olefins as later described and polymerizing said concentrated olefins at temperatures of 750° to 1000° F. while under pressure of 500 to 3000 lbs. per square inch above atmospheric, cooling gases and products from the polymerization step without substantial reduction in pressure, introducing said gases and condensed liquid products into a separator under said pressure, introducing aforesaid low olefin content gas into said separator at a low point therein, removing undissolved fixed gases from an elevated point therein and eliminating said fixed gases from the system, withdrawing liquid products and dissolved gases therefrom, separating said liquid products and dissolved gases in a plurality of stages, separating released gases from each stage, returning released gases from one or more stages to the polymerization step and passing released gases from other stages to the aforesaid high temperature gas cracking step whereby additional low olefin content gas is formed.

WILLIAM B. PLUMMER.